US011564066B2

United States Patent
Lynn et al.

(10) Patent No.: US 11,564,066 B2
(45) Date of Patent: Jan. 24, 2023

(54) COORDINATING INFORMATION ACROSS MULTIPLE DEVICES TO FACILITATE END-OF-DAY DISMISSAL AT A SCHOOL

(71) Applicants: Brian Lynn, Atlanta, GA (US); Cara Buchanan Whipple, Atlanta, GA (US)

(72) Inventors: Brian Lynn, Atlanta, GA (US); Cara Buchanan Whipple, Atlanta, GA (US)

(73) Assignee: Queful, LLC, Atlanta, GA (US)

( * ) Notice: Subject to any disclaimer, the term of this patent is extended or adjusted under 35 U.S.C. 154(b) by 0 days.

(21) Appl. No.: 16/571,110

(22) Filed: Sep. 14, 2019

(65) Prior Publication Data

US 2020/0178044 A1    Jun. 4, 2020

Related U.S. Application Data

(60) Provisional application No. 62/731,419, filed on Sep. 14, 2018.

(51) Int. Cl.

| | |
|---|---|
| *H04W 4/08* | (2009.01) |
| *H04L 67/12* | (2022.01) |
| *G08G 1/00* | (2006.01) |
| *G06F 3/14* | (2006.01) |
| *G06F 3/0482* | (2013.01) |
| *H04W 4/021* | (2018.01) |
| *H04L 67/01* | (2022.01) |

(52) U.S. Cl.
CPC ............ *H04W 4/08* (2013.01); *G06F 3/0482* (2013.01); *G06F 3/1423* (2013.01); *G08G 1/207* (2013.01); *H04L 67/01* (2022.05); *H04L 67/12* (2013.01); *H04W 4/021* (2013.01)

(58) Field of Classification Search
CPC ....................................................... G07C 9/00
See application file for complete search history.

(56) References Cited

U.S. PATENT DOCUMENTS

| | | | |
|---|---|---|---|
| 9,129,239 B2 | 9/2015 | Rogers et al. | |
| 2003/0137435 A1* | 7/2003 | Haddad | G08G 1/133 340/994 |
| 2011/0161130 A1* | 6/2011 | Whalin | H04W 4/21 705/14.5 |
| 2014/0306609 A1* | 10/2014 | Kang | H05B 47/175 315/117 |
| 2017/0061719 A1* | 3/2017 | Ruiters | G01C 21/36 |
| 2017/0316689 A1 | 11/2017 | Houts et al. | |

* cited by examiner

*Primary Examiner* — Nabil H Syed
*Assistant Examiner* — Cal J Eustaquio
(74) *Attorney, Agent, or Firm* — Paul Frank + Collins P.C.

(57) ABSTRACT

A system that is configured to coordinate student dismissal at end of day. The system may use a central server to maintain information across multiple different devices, each for different functions in the dismissal process.

18 Claims, 13 Drawing Sheets

FIG. 6
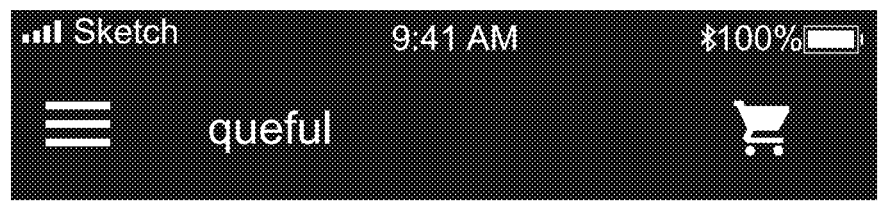
 Johnny Doe                 123
Miyagi Karate
2:45 pm-Primary School Carpool
 Authorized Driver
Parent
John Doe
Friend
Catherine Smith
← 170
CANCEL   ADD TO QUEUE FIG. 11
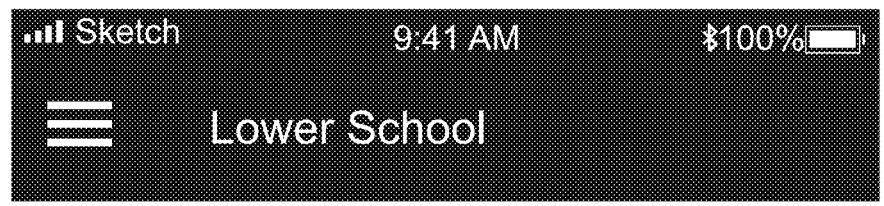
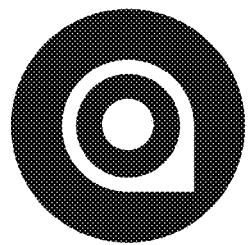
When you are ready to start releasing students into carpool press the "Start Carpool" button below.
START CARPOOL ← 194

FIG. 12
 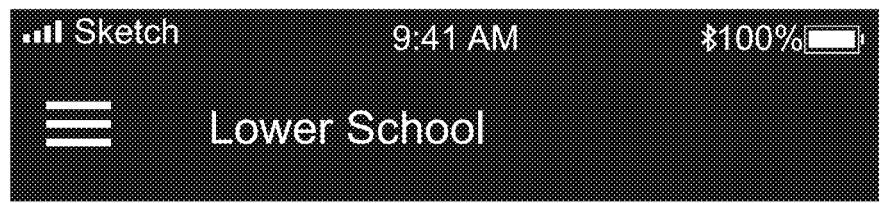

COORDINATING INFORMATION ACROSS MULTIPLE DEVICES TO FACILITATE END-OF-DAY DISMISSAL AT A SCHOOL

CROSS-REFERENCE TO RELATED APPLICATIONS

This application claims the benefit of priority to U.S. Ser. No. 62/731,419, filed on Sep. 14, 2018, and entitled "COORDINATING INFORMATION ACROSS MULTIPLE DEVICES TO FACILIATE END-OF-DAY DISMISSAL AT A SCHOOL." The content of this application is incorporated by reference herein in its entirety.

BACKGROUND

End-of-day dismissal presents particular challenges at many schools. The process must ensure that students of all ages safely get to their appropriate transport or afterschool activity. Parents and drivers, on the other hand, wish the process to occur as "timely" as possible so as not to stand idle or "wait" for too long. Quite often, these interests (among others) tend to stand in exact opposition with one another.

New tools attempt to balance these competing interests. These tools automate some, or even all, of the dismissal process to move students from their classrooms to designated pick-up areas or other areas (or activities). While efficient, some tools require the school to deploy new hardware, which can give rise to other issues or problems including hardware reliability or maintenance (at least to replace batteries). Other tools require the school to adopt new or different processes that can disrupt current workflow, require training (or re-training) of staff, or simply overly complicate dismissal with extraneous features not necessary for the school to achieve its underlying objective to ensure students get safely and timely off of campus at the end of the school day.

SUMMARY

The subject matter disclosed herein relates to improvements that address these issues. Of particular interest are embodiments that coordinate information flow between several connected devices to control flow of students from classrooms to awaiting vehicles (or afterschool activities). These embodiments allow schools to maintain their present workflow without the need to adopt (or purchase) any new hardware.

DRAWINGS

Reference is now made briefly to the accompanying drawings, in which:

FIG. 6 depicts a diagram for a configuration of a user interface for cataloging vehicles for use in the system of FIG. 1;

FIG. 11 depicts a diagram for a configuration of a user interface for monitoring dismissal process for use in the system of FIG. 1;

FIG. 12 depicts a diagram for a configuration of a user interface for monitoring dismissal process for use in the system of FIG. 1.

Figure 1:
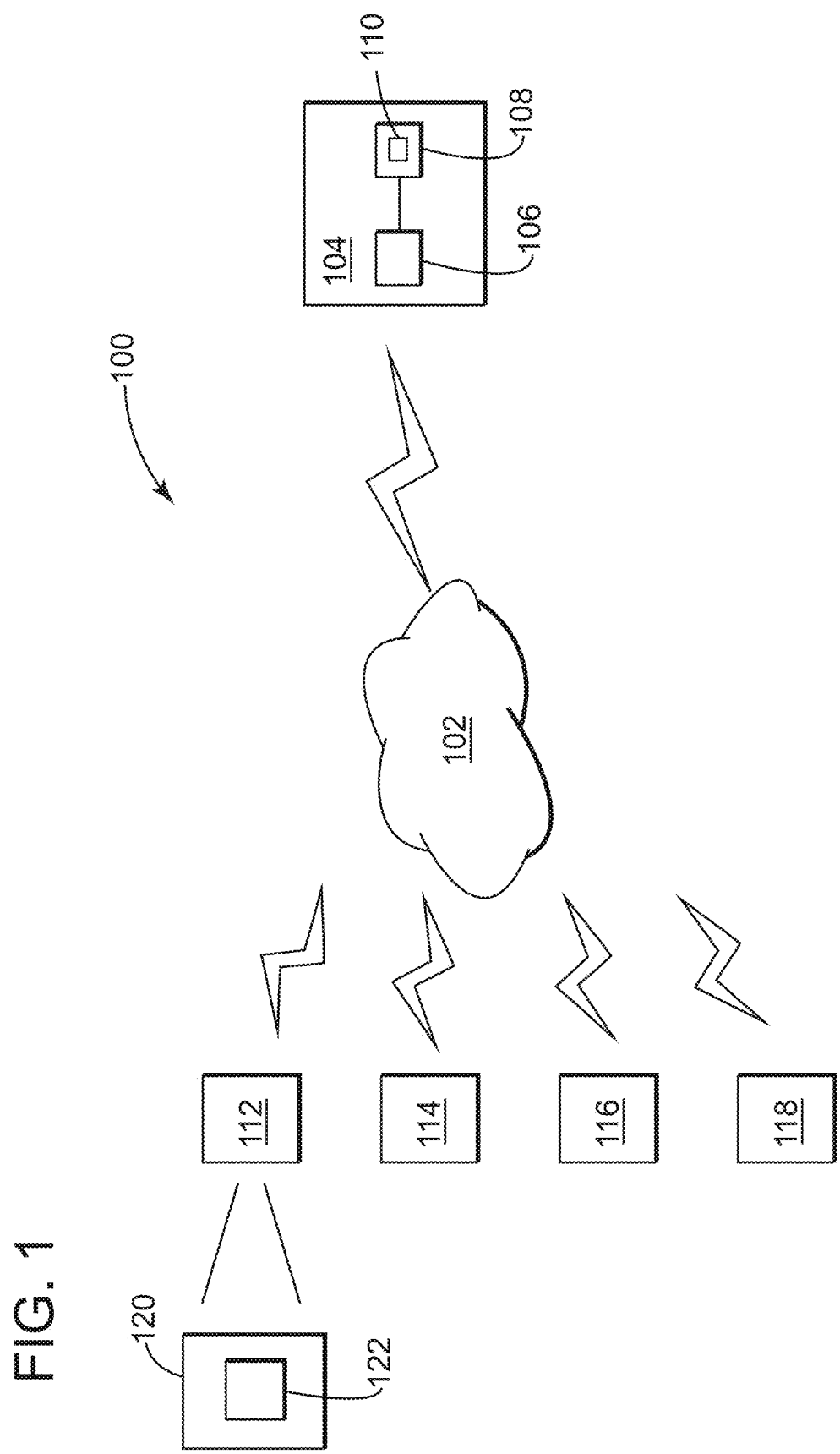
FIG. 1 depicts a schematic diagram of a system to manage logistics of end-of-day dismissal at a school.

Where applicable, like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

DETAILED DESCRIPTION

School dismal practices often utilize antiquated models to get students off school grounds. These models employ radios to convey status of student transportation (e.g., parents, carpools, etc.) from one or more individuals ("stagers") that meet or "stage" vehicles in a parking area to staff inside the school. The staff, in turn, broadcast auditory announcements throughout the school. These announcements are meant to cue students (or teachers) to timely leave the classroom to meet their ride. The model then relies on visual confirmation, like a hand signal, between the stagers and drivers to ensure that students safely arrive at their respective vehicle. For batch dismissal, where vehicles load and leave in groups, the stagers can only release the group after all drivers in the group can confirm that their students have arrived at for rides.

Advances in technology provide opportunities to better manage end-of-day traffic of students. The embodiments herein, for example, are configured to leverage wireless networks and smart devices to move data and information among parents, stagers, teachers, and school staff (and administrators). These configurations can allow for real-time direction of a student from the classroom to their waiting ride or afterschool activity. Other configurations can coordinate data and information between parents and schools to provide updates "on-the-fly," such as might occur when parents change pick-ups or sign their students up for afterschool activities during the school day. These features provide a holistic ecosystem that parents and schools can use to manage the myriad of communications that would nominally occur via email, phone, or personal interaction between the parents and school. Other embodiments are with the scope of this disclosure.

FIG. 1 depicts a schematic diagram of an example of a system 100 that addresses the shortcomings and inefficiencies of the "auditory" dismissal model. The system 100 includes a network 102 that connects with a server 104. Examples of the server 104 may comprise a processor 106 that couples with memory 108 to access executable instructions 110 stored thereon. The network 102 can connect the server 104 with terminals, for example, computing devices that an end user can utilize to enter, receive, and visualize data. The computing devices may embody a laptop, tablet, smart phone, or "smart board"; but this disclosure does not foreclose use of other devices as well. At a school, the terminals may include classroom-based devices 112 and a pair of staging devices (e.g., a first staging device 114 and a second staging device 116). The network may also connect with a "transiting" device 118 that may transit to and from the school. As also shown, the devices 112, 114, 116, 118 may have with a display 120 that can display a user interface 122.

At a high level, the system 100 is configured to coordinate movement of students at the school. These configurations provide a tool to administer orderly and timely dispatch of students from classroom to transportation or other activities at the end of the school day. This tool also incorporates built-in safety measures that ensure every student meets their ride. Unlike practice-to-date, however, the tool foregoes the need to include any intermediary staff "layer" to the workflow. The tool also does not rely on auditory signals to prompt dismissal of students from the classroom. Rather, the embodiments here coordinate flow of information in real-time between the staging area and the classroom that leads to expeditious dismissal of students and hastens release of vehicle groups from school grounds.

The network 102 can be configured to facilitate data transmission. These configurations may leverage existing infrastructure at the school, like local area network (LAN) that connects devices together to exchange data. Such infrastructure may use wired or wireless protocols for this purpose. The LAN infrastructure likely connects with broadband or similar networking services and service providers that provide access to the Internet (or comparable interconnected computer network).

The server 104 can be configured to provide or "serve" data. Together with the network 102, the server 104 may operate in "client-server" models (or architecture). Examples of these models facilitate data exchange between the server 104 and any connected devices in the system 100. The model may employ a web browser (including a mobile web browser) and a web server to generate content for the user interface 122. The server 104 may operate as the web server, for example, that configures output as one or more Web pages (or like displayable content) on the web browser. This feature allows the system 100 to automate dispatch processes without the need for the school to add any additional hardware.

Generally, terminals 112, 114, 116, 118 can be configured to operate as the "client" in the client-server model. These configurations may include executable instructions or software resident on the device that operate as a web browser or mobile software application. This software permits data exchange with the server 104 over the network 102.

The classroom-based devices 112 may be configured as functional parts of the classroom. These configurations may embody "smart boards" that have interactive display screens to display the user interface 122. Promethean® boards are one example of this technology. However, the system 100 can leverage any device with visual display (e.g., laptops, desktops, projectors, televisions, etc.) that is accessible to students in the classroom. Administrative offices, for example, may have laptop or desktop computers that access the network 102 as part of the system 100.

The staging devices 114, 116 can be configured to reside at or proximate vehicle staging areas at the school. These configurations allow individuals, typically school staff member or member(s), to manage flow of vehicles and students into and out of the staging area. These individuals may benefit from use of portable or mobile devices (e.g., tablet), but this is not always necessary.

The transiting device 118 can be configured for use by parents or guardians. These configurations include mobile devices (e.g., smart phones and tablets) as well as laptops. At home or office, the transiting device 118 may embody other non-transiting devices, like desktop computers. Parents may use these devices to access functionality that is useful to manage activities with the school, including dismissal.

The user interface 122 can be configured with interactive functions to timely receive and, in turn, exchange information between individuals that leverage the system 100. These configurations may embody different designs as between, for example, the devices 112, 114, 116, 118. Generally, the designs may conform to a type of device, e.g., as an "app" on mobile devices or as a web page on a web browser. The device may dictate the functions particular for an end user that operates the device. The functions may solicit information from parents to open an account (or "profile"), such as contact information about themselves, their students, relatives, or emergency contacts. This contact information may include names, addresses, phone numbers, and email addresses. However, in one implementation, this information may reside in one or more data files (for example, as provided by the school). The functions may also permit parents to input health or medical data (e.g., allergies, medication, etc.) particular to their students. The functions may further permit parents to register their students for activities, either on or off school grounds. In one implementation, the functions may display a listing of available activities or allow parents to add activities not found on any pre-populated listing. The functions may solicit payment methods (e.g., credit cards), which the system 100 can associate with the profile. This feature may allow parents to make payments as part of registration of their students for activities, as desired. For dismissal, the functions may allow parents to manage incoming vehicles, make changes to afterschool activities, or change authorized drivers for their students.

As discussed in the example below, the system 100 creates an ecosystem to facilitate exchange of this data and information. This ecosystem can timely update teachers and staff with changes to dismissal information for students, for example, by way of real-time changes to the user interface 122 on the smart boards 112 in the classroom. These changes may visually add an afterschool activity for a student concomitantly with registration that a parent completes during the school day. Changes to the user interface 122 on the staging devices 114, 116 may visualize as changes in an authorized driver that will meet a student at dismissal. As an added benefit, the teachers and staff at the school may have ready access to pertinent information (e.g., health or medical data) about the student on the user interface 122 of other computing devices. This feature can improve response time for student emergencies, for example, due to rapid, acute allergic reactions.

Figure 2:
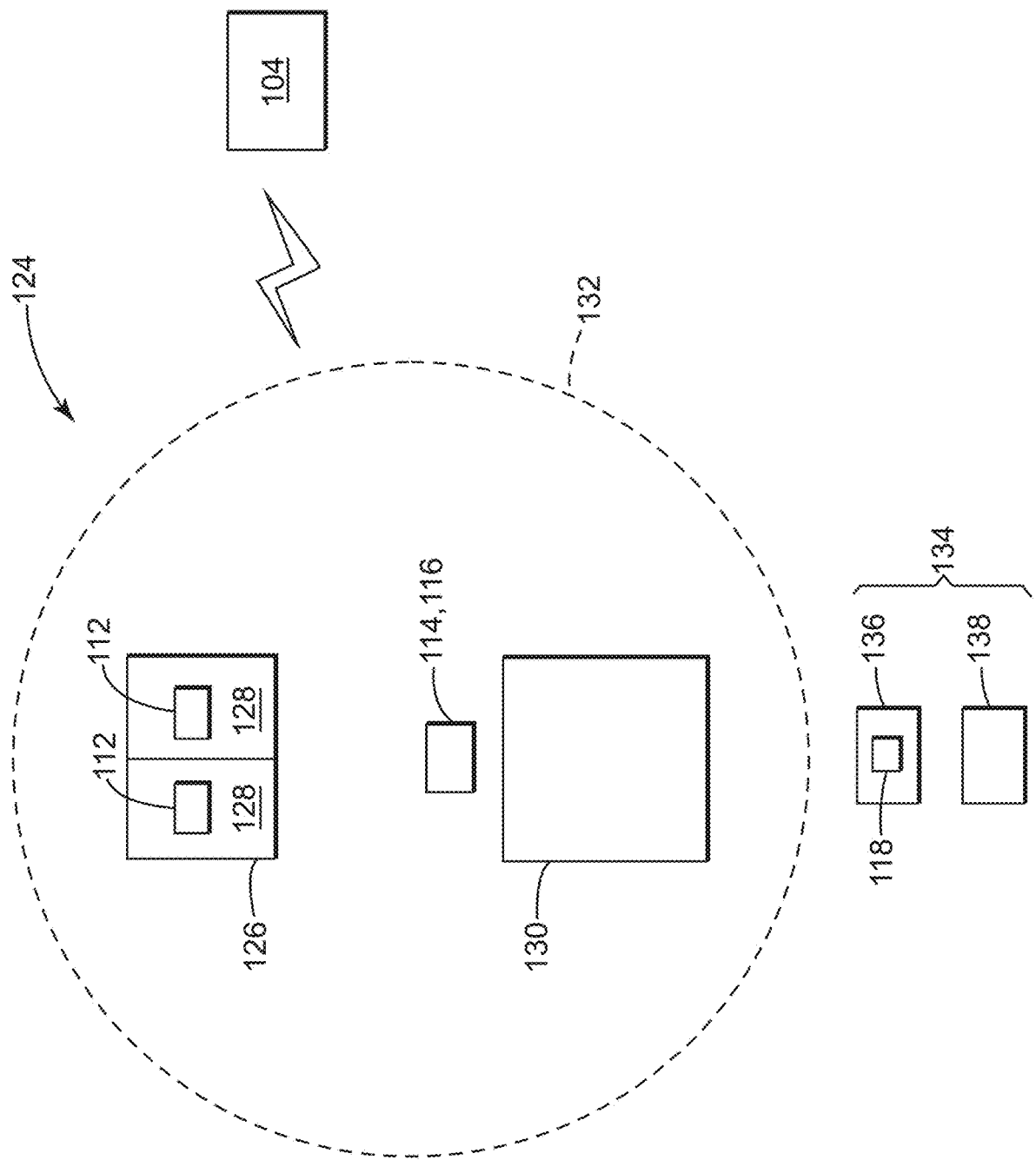
FIG. 2 depicts a schematic diagram of an implementation of the system of FIG. 1.

FIG. 2 depicts a schematic diagram of an exemplary implementation of the system 100 of FIG. 1. The school may have a campus 124 with a school building 126 having classrooms 128. The campus 124 may also include a pick-up area 130 where vehicles and students may congregate for end-of-day dismissal. In one implementation, the system 100 may establish a boundary 132 that, typically, circumscribes at least part of the campus 124. The boundary 132 or "geofence" operates as a virtual threshold that is useful to identify incoming vehicles 134. This virtual threshold may embody one or more coordinates or sets of coordinates that define latitude and longitude of points on or in proximity to the campus 124. These points may reside at select distances from the pick-up area 130 or entrance to the campus 124. At end-of-day, incoming vehicles 134 enter the campus 124 to pick-up or transport students from the school. The incoming vehicles 134 may embody connected vehicles (e.g., vehicle 136) and non-connected or "dark" vehicles (e.g., dark vehicle 138). Connected vehicles 136 may include the transiting device 118 that is resident with a driver or a passenger. It is also possible that electronics built into the connected vehicles 136 has appropriate functionality for this purpose as well. In one implementation, the system 100 can use location functions (e.g., Global Positioning Systems) on the transiting device 118 to identify a proximity position for the connected vehicles 138 relative to the campus 102. This position is useful to provide information on the user interface 122 of devices 112, 114, 116 or to provide other indications that the connected vehicles 136 are on or near the campus 124.

Figure 3:
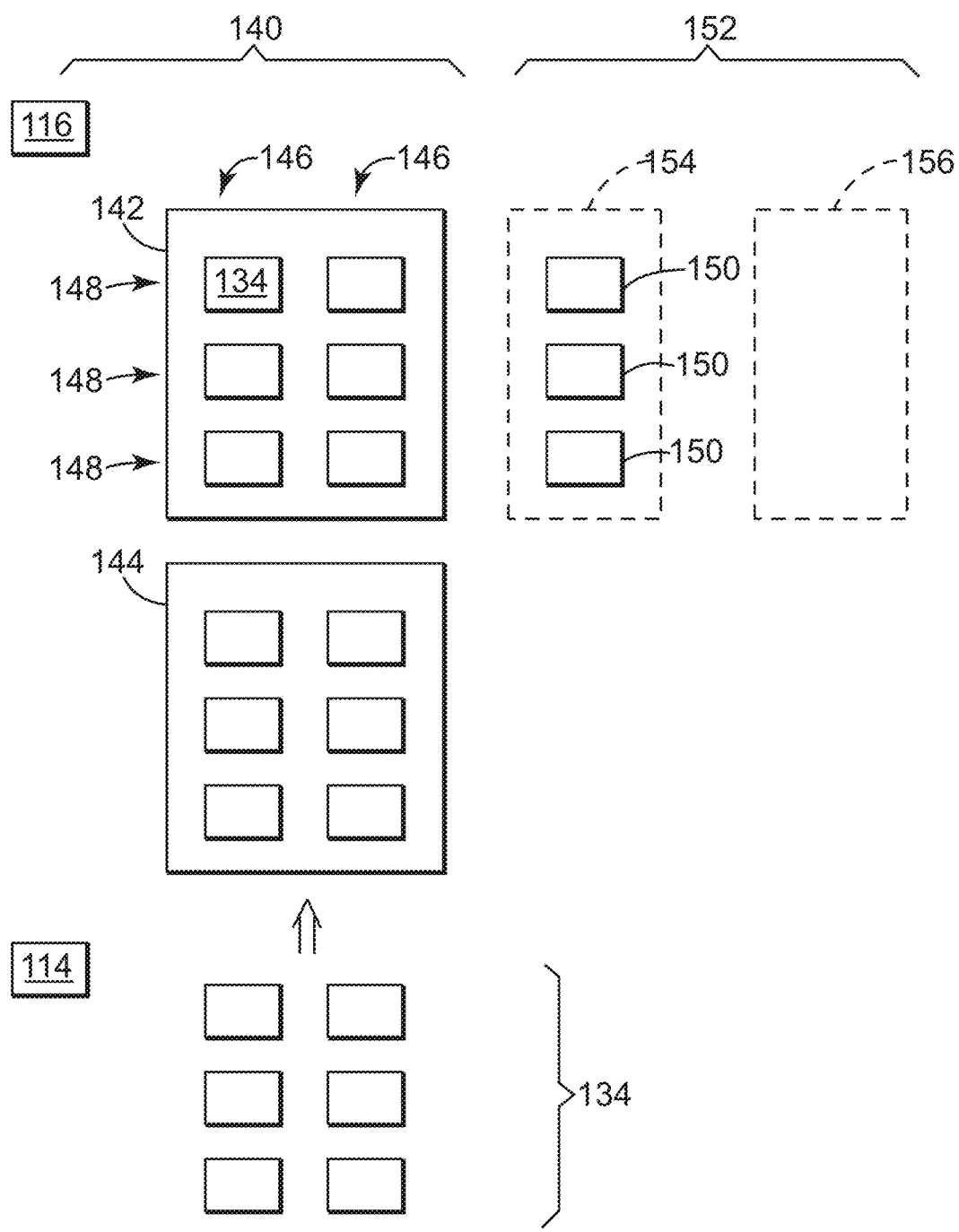
FIG. 3 depicts a schematic diagram showing details of the implementation of FIG. 2.

FIG. 3 depicts a schematic diagram of an example of the pick-up area 130. This example includes a loading area 140 with a first group 142 of incoming vehicles 134. A second group 144 resides "upstream" of the loading area 140. The groups 142, 144 may assume a row-and-column structure with one or more columns 146 and rows 148. This structure may result from driving lanes or other demarcations that direct traffic of incoming vehicles 134 on the grounds 124. For purposes of this example, the groups 142, 144 include six (6) vehicles in two (2) columns and three (3) rows; however more or fewer of each may prevail as necessary to accommodate any number of incoming vehicles 134. As also shown, identifiers 150 are found adjacent the loading area 140. The identifiers 150 may embody visual "icons" that adorn the ground or nearby signage. The icons may stand apart from one another to substantially align with the vehicle rows 148 of the group (e.g., group 142) found in the loading area 140. The identifiers 150 may reside in a student waiting area 152, for example, a sidewalk or part of the grounds 124 that is safe for students to wait to board their respective ride. In one implementation, the waiting area 152 may have one or more student assembly locations (e.g., a ready-load location 154 and an on-deck location 156). The locations 154, 156 serve as a queue for students that have left their classrooms to load into vehicles found in the loading area 140. Nominally, the ready-load location 154 may queue students that correspond with vehicles in the first group 142 (found in the loading area 140). The on-deck location 156 may queue students that correspond with vehicles in the second group 144.

Figure 4:
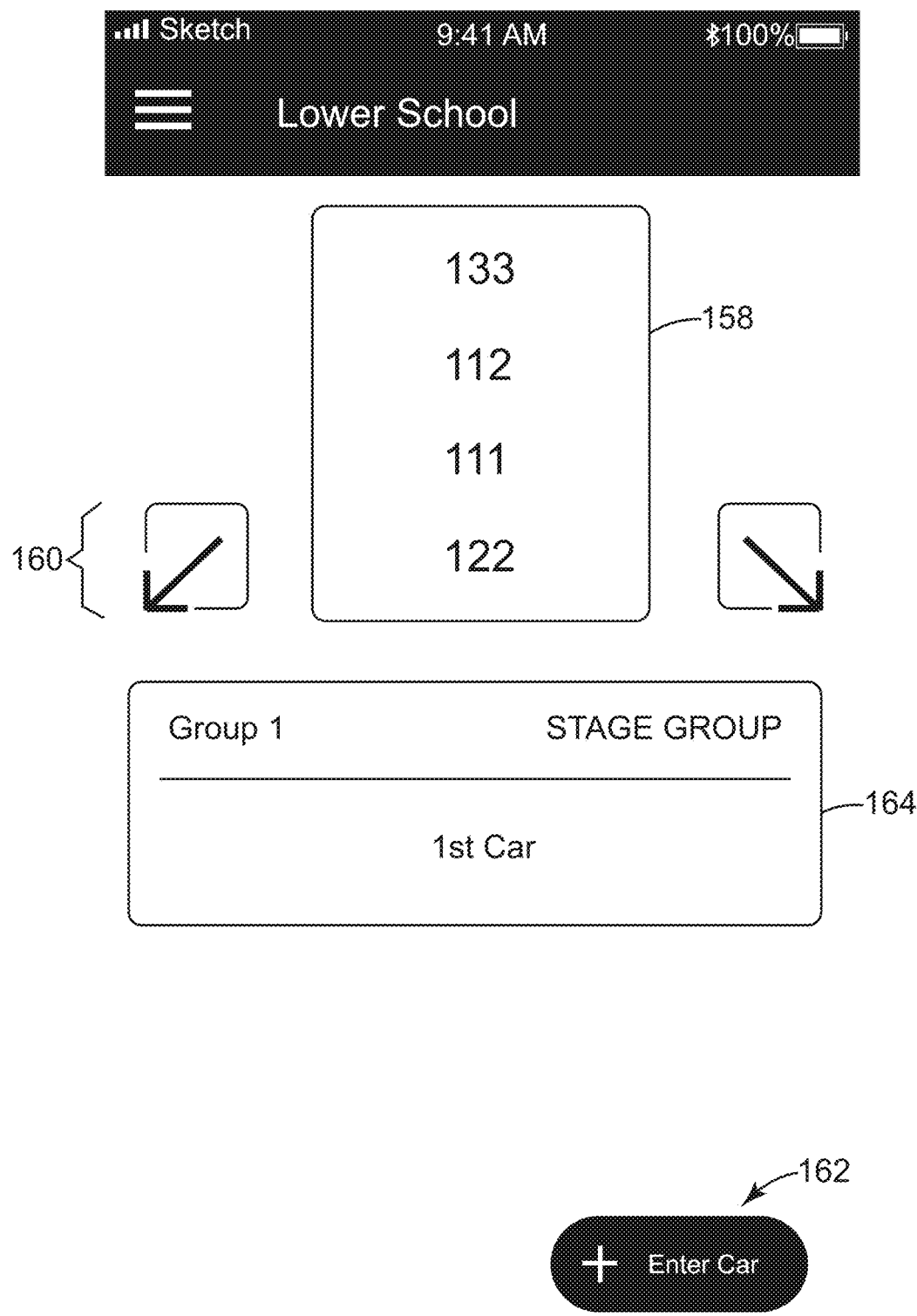
FIG. 4 depicts a diagram for a configuration of a user interface for cataloging vehicles for use in the system of FIG. 1.

FIG. 4 depicts a diagram for a configuration of the user interface 122 found on the staging device 114. These configurations may include interactive features (and icons) that allow a "stager" to catalog incoming vehicles 134 to create the groups 142, 144. These features may include a vehicle assignment area that allows the stager to catalog incoming vehicles 134 that are in the pick-up area 140. This process may benefit from a vehicle identification area 158, a location function 160, and an entry function 162. In one implementation, the identification area 160 may embody a listing of vehicle identifiers that describe or define incoming vehicles 134. Suitable identifiers can vary, but often correspond with data (e.g., name, student numbers, tag identification, etc.) held or assigned by the school. The system 100 may populate the vehicle identifiers automatically in response to the proximity position of connected vehicles 136 to the geofence 132. The location function 162 provides icons for the stager to associate the vehicle identifier with the column 146 (e.g., "left" or "right" for this two-column structure) or other "coordinates" that define the position of the incoming vehicle 134 in the row-and-column structure. Interface with the appropriate "left" or "right" icon may, concomitantly, move the vehicle identifier into a staging visualization area 164 to assign the row 148, which corresponds with sequential placement in the grid (e.g., starting with the "$1^{st}$ car").

Figure 5:
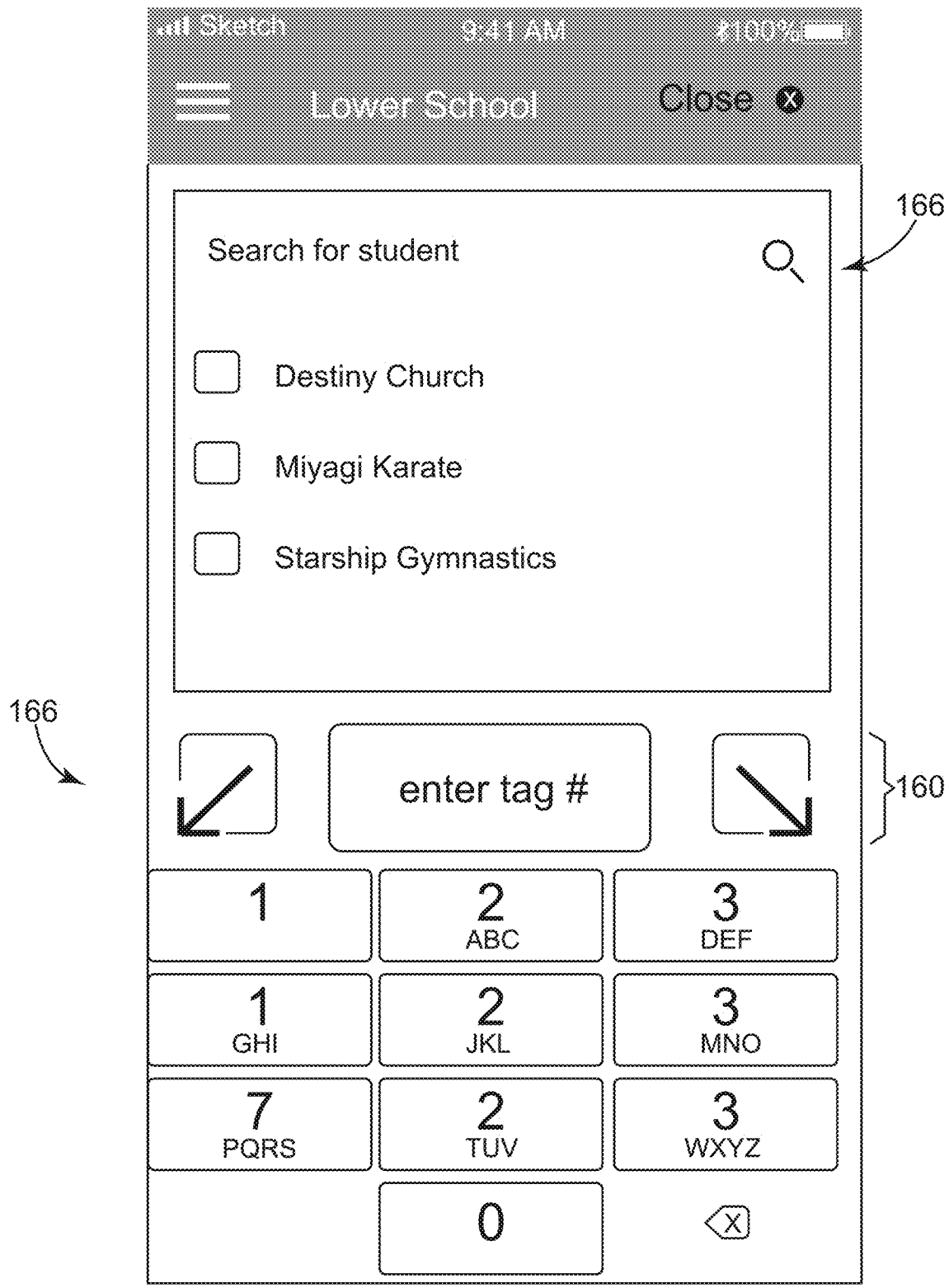
FIG. 5 depicts a diagram for a configuration of a user interface for cataloging vehicles for use in the system of FIG. 1.

FIGS. 5 and 6 depicts diagrams for configurations of the user interface 122 that correspond with the entry function 162. These configurations also include interactive features, here to allow the stager to retrieve vehicle identifier data (e.g., stored on server 104) for "dark" vehicles 138. These features may include an input screen 166 (e.g., a keyboard) to allow the stager to manually enter the vehicle identifier. A search function 168 may allow the stager to input information (e.g., student name, driver name, etc.) to obtain the vehicle identifier, as well. An "add" function 170 may allow the stager to add the vehicle identifier to the staging visualization area 164.

Figure 7:
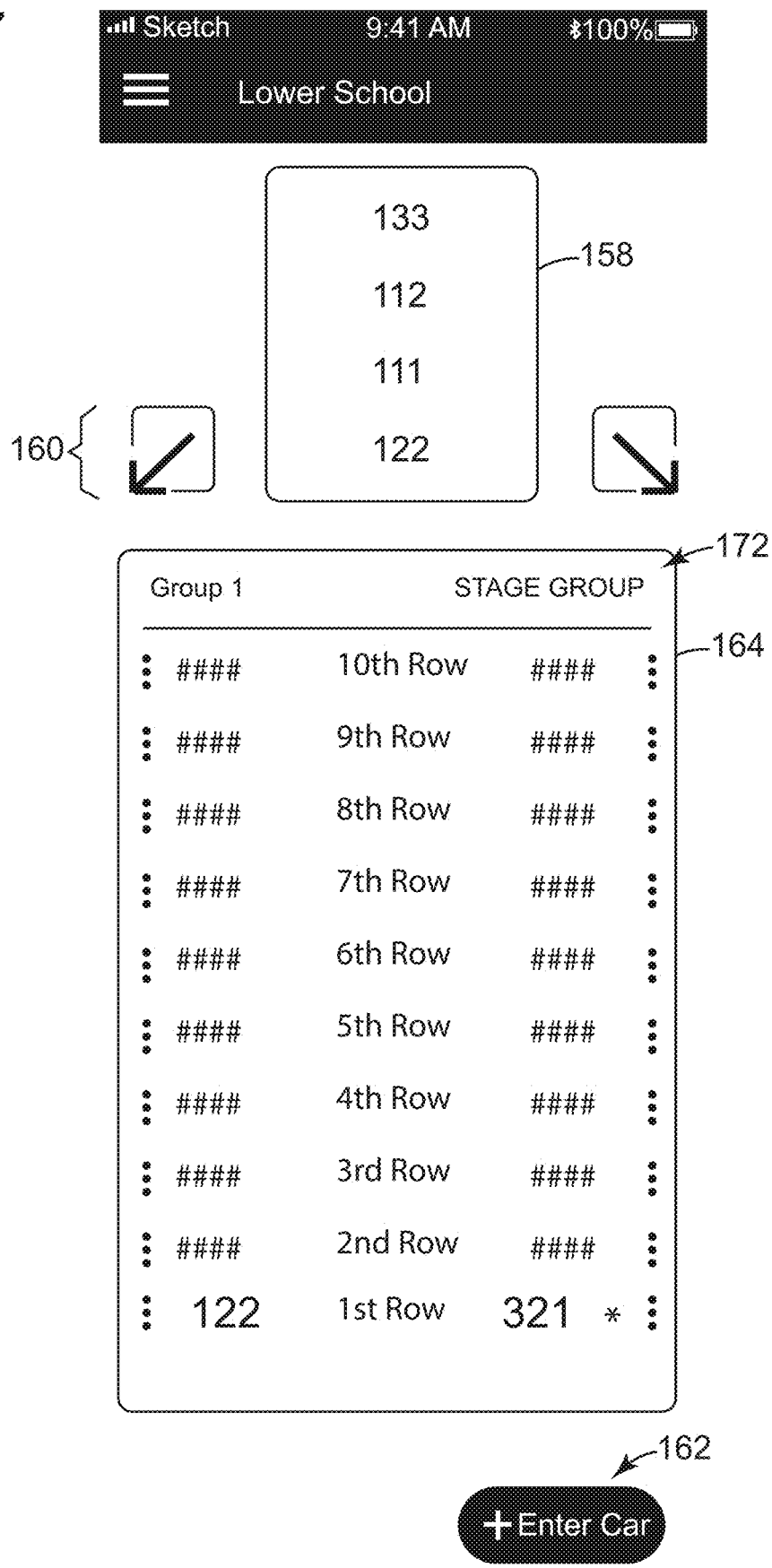
FIG. 7 depicts a diagram for a configuration of a user interface for cataloging vehicles for use in the system of FIG. 1.
Figure 8:
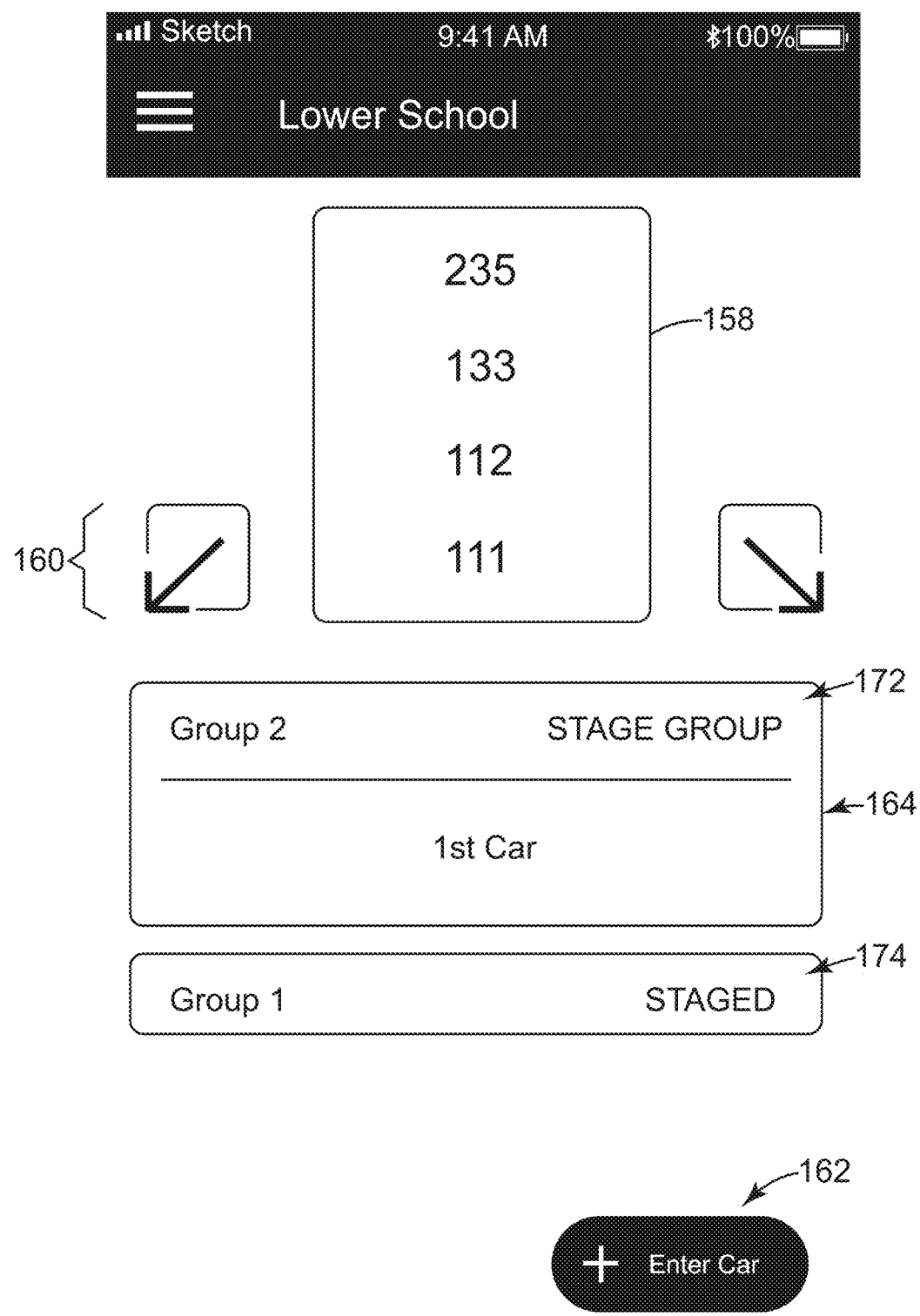
FIG. 8 depicts a diagram for a configuration of a user interface for cataloging vehicles for use in the system of FIG. 1.

FIGS. 7 and 8 depict diagrams for configurations of the user interface 122 found on the staging device 114. The staging visualization area 164 may include a "stage group" function 172 to allow the stager to "close" or confirm "release" of the group. The stager may leverage this feature once vehicle identifiers populate all of the positions in the row-and-column structure. As best shown in FIG. 8, following release, the staging visualization area 164 may provide a status function 174 for the "staged" group (e.g., first group 142). It may also allow the stager to begin to catalog incoming vehicles 134 for another group (e.g., second group 144).

Figure 9:
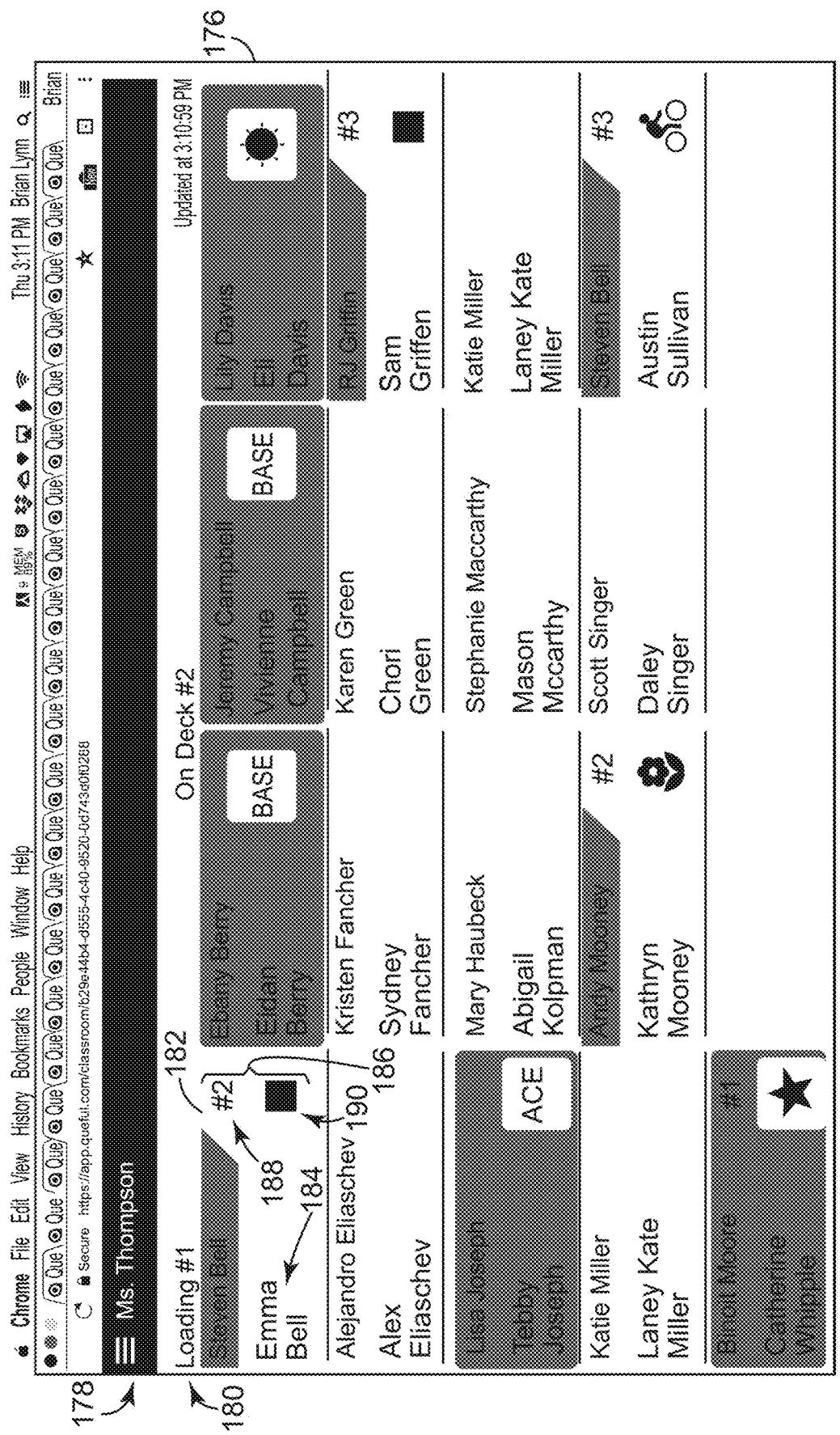
FIG. 9 depicts a diagram for a configuration of a user interface found in a classroom for use in the system of FIG. 1.
Figure 10:
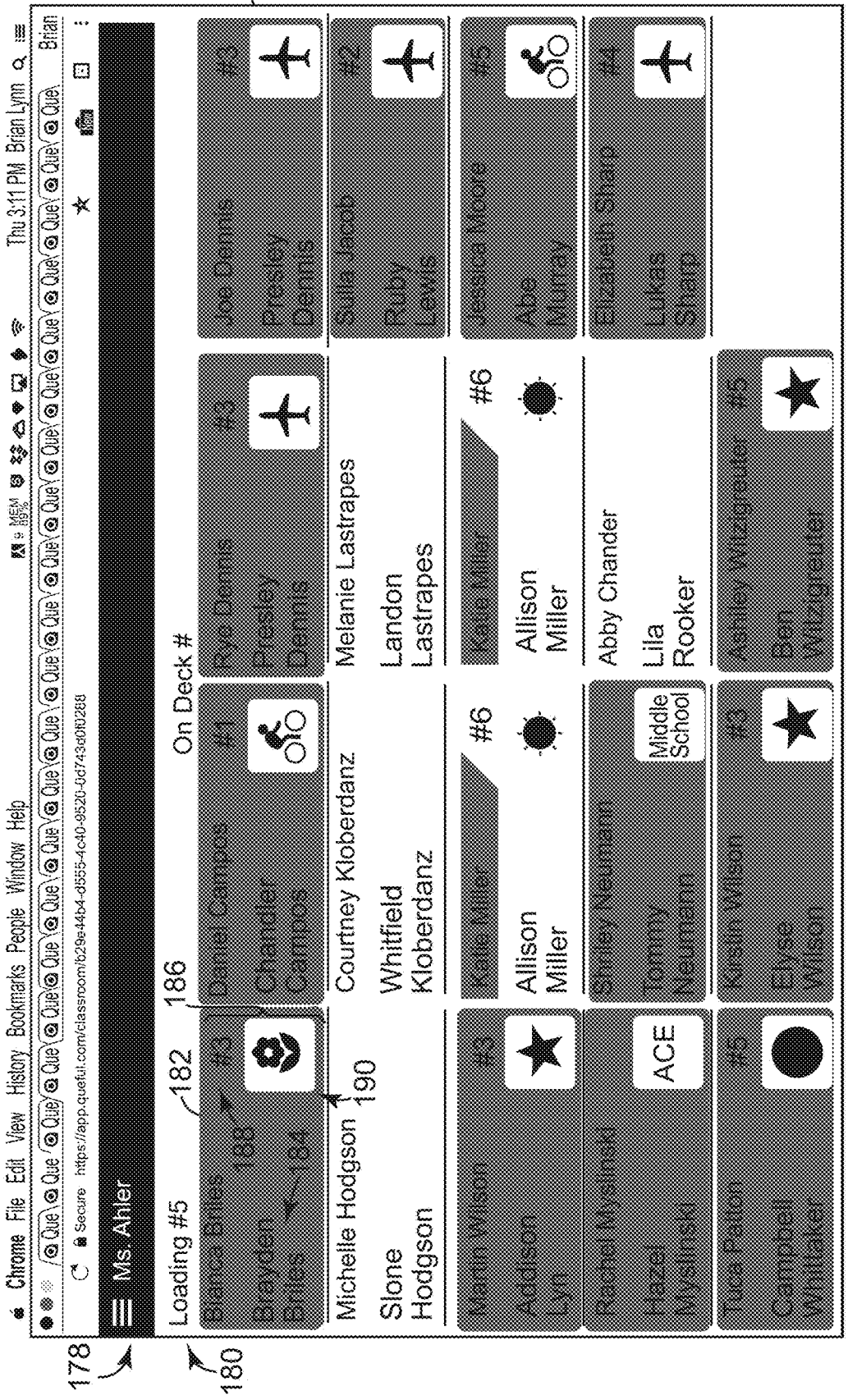
FIG. 10 depicts a diagram for a configuration of a user interface found in a classroom for use in the system of FIG. 1.

FIGS. 9 and 10 depict diagrams of configurations for the user interface 122 for use on the classroom-based devices 112. This configuration may include a content area 176 with content that provides information specific to students in classrooms 128. The content may include a room identifier 178 (found here at the top of the user interface 122). For schools, the room identifier 178 may identify a teacher name, a room number, or other piece of information that is helpful to differentiate the user interface 122 as between different classrooms 128. The content may also include queuing information 180 that provides status information to inform students about the progress of dismissal, for example, that students with rides in the first group 142 (e.g., Group 1) and rides in the second group 144 (e.g., Group 2) should proceed to (or are already located in) the ready-load location 154 and the on-deck location 156, respectively. The content also includes individual identifiers 182 with personal identification information 184 and dismissal information 186. The individual identifiers 182 may embody a "block" or section of the content area 176 that is personalized for each student in the classroom. The system 100 operates to maintain content in these blocks to provide a unique, visual area on the user interface 122 that is easily recognizable to both students and teachers. In one implementation, the personal identification information 184 in this visual area may include the student's name or school identification (ID) number, as well as their authorized driver. The dismissal information 186 may correspond with information the stager provides through the staging device 114. This information may include the group number, shown here as both a numerical identifier 188 ("Group 1," "Group 2," and "Group 3") and a visual icon 190 that corresponds to the identifiers 150 in place at the loading area 140. The dismissal information 186 may also identify alternative arrangements for the student, for example, afterschool programs (ACE, BASE, etc.) in lieu of transport that would be found at the loading area 140. In one implementation, the system 100 may change the appearance of the individual identifiers 182 to inform changes in status of the incoming vehicle 134. These changes may include shading, coloring, backlighting, or other options that can indicate different status. One status may partially color the name as indication that the incoming vehicle 134 is on the campus 124. A second status may fully color the individual identifier 182 as indication that the stager has cataloged the incoming vehicle 134 to one of the awaiting groups (e.g., groups 142, 144).

FIG. 11 depicts a diagram for configurations of the user interface 122 for the staging device 116. These configurations may include interactive features (and icons) that allow a "monitor" to cause students in the classrooms 128 to move to the loading area 140. The features may include a monitor interface 192 with an initiation function 194. The monitor can use the function 194 to begin the dismissal process, often after the stager has cataloged at least one vehicle group (e.g., group 142). Use of the initiation icon 194 may cause the queuing information 180 on the classroom devices 112 to indicate that Group 1 is ready to load and that Group 2 is on-deck. Teachers and staff can dismiss students with dismissal information 186 that corresponds with Groups 1 and 2 to proceed to the locations 154, 156 to await further instructions.

Figure 13:
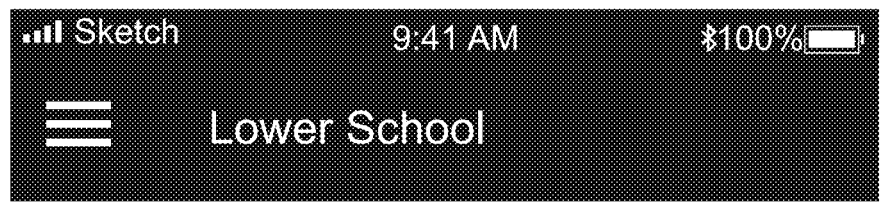
FIG. 13 a diagram for a configuration of a user interface for monitoring dismissal process for use in the system of FIG. 1.

FIGS. 12 and 13 also depict diagrams of the user interface 122 for the staging device 116. The monitor interface 192 may include a count 196 that coincides with the number of vehicles in the staging visualization area 164 (and the loading area 140) for the staged Group 1. The monitor can increment the count 196 to indicate confirmation that the students in the ready-load location 154 properly load into the corresponding vehicles 134 in Group 1. In FIG. 13, the monitor interface 192 may include a group release function 198 that is available once the count 196 ensures that all students reach the incoming vehicles 134 in Group 1. Use of the group release function 198 may cause the queueing information 180 on the classroom devices 112 to indicate that Group 2 is ready to load and that the next group (e.g., Group 3) is on deck. Teachers or staff may dismiss the students with dismissal information 186 that corresponds with Group 3 to proceed to the on-deck location 146 to await further instructions. The monitor maintains control of this process until all students dismiss to the vehicle groups.

In light of the foregoing, the embodiments herein improve logistics for schools and parents to plan and execute dismissal from school. These embodiments can provide information across multiple devices and displays, all in real-time, so as to efficiently move students from classroom to vehicles and to move vehicles off of campus.

This written description uses examples to disclose the invention, including the best mode, and also to enable any person skilled in the art to practice the invention, including making and using any devices or systems and performing any incorporated methods. An element or function recited in the singular and proceeded with the word "a" or "an" should be understood as not excluding plural said elements or functions, unless such exclusion is explicitly recited. References to "one embodiment" of the claimed invention should not be interpreted as excluding the existence of additional embodiments that also incorporate the recited features. Furthermore, the claims are but some examples that define the patentable scope of the invention. This scope may include and contemplate other examples that occur to those skilled in the art. Such other examples are intended to be within the scope of the claims if they have structural elements that do not differ from the literal language of the claims, or if they include equivalent structural elements with insubstantial differences from the literal language of the claims.

Examples appear below that include certain elements or clauses one or more of which may be combined with other elements and clauses describe embodiments contemplated within the scope and spirit of this disclosure.

What is claimed is:

1. A method, comprising:
at a computing device that is configured to operate as a server in a client-server network, the server comprising a processor with access to executable instructions for,
generating a first user interface on a terminal that requires an end user to manually assign incoming vehicles to positions in dismissal groups at a staging area on school grounds, the positions associated with a vehicle identifier that is assigned to each of the incoming vehicles, the dismissal groups each having a fixed number of positions;
assigning students in a classroom to one of the dismissal groups;
indicating, on a display in the classroom, the dismissal group for each student;
generating a second user interface on a terminal that requires an end user to manually begin a dismissal process once the fixed number of positions are filled and that updates the display in the classroom with queueing information to indicate dismissal of all of the students assigned to one of the dismissal groups from the classroom and in sequence according to the dismissal group; and
generating a third user interface on a terminal that requires an end user to manually release the vehicle groups from the staging area according to a count that associates each student with one of the incoming vehicles.

2. The method of claim 1, further comprising:
pre-populating a list of vehicle identifiers in response to proximity of the incoming vehicles to a geo-fence; and
allowing an end user to select vehicle identifiers from the list to create the dismissal groups.

3. The method of claim 1, further comprising:
allowing an end user to update the queueing information from a first dismissal group to a second dismissal group.

4. The method of claim 1, further comprising:
showing on the display a status for incoming vehicles associated with each of the students.

5. The method of claim 1, further comprising:
changing a status for each of the students on the display in response to proximity of incoming vehicles relative to a geo-fence.

6. A system, comprising:
a server; and
executable instructions stored on the server, the executable instructions for exchanging data among devices connected to a network to facilitate dismissal of students from a classroom,
wherein the executable instructions include instructions to:
generate a first user interface on a terminal that requires an end user to manually assign incoming vehicles to positions in dismissal groups at a staging area on school grounds, the positions associated with a vehicle identifier that is assigned to each of the incoming vehicles, the dismissal groups each having a fixed number of positions;
assign students in a classroom to one of the dismissal groups;
indicate on a display the dismissal group for each student;
generate a second user interface on a terminal that requires an end user to manually begin a dismissal process once the fixed number of positions are filled and that updates the display in the classroom with queueing information to indicate dismissal of all of the students in a dismissal group from the classroom and in sequence according to the dismissal group; and
generating a third user interface on a terminal that requires an end user to manually release the vehicle groups from the staging area according to a count that associates each student with one of the incoming vehicles.

7. The system of claim 6, wherein the executable instructions include instructions to:
pre-populate a list of vehicle identifiers in response to proximity of the incoming vehicles to a geo-fence; and
allow an end user to select vehicle identifiers from the list to create the dismissal groups.

8. The system of claim 6, wherein the executable instructions include instructions to:
allow an end user to update the queuing information from a first dismissal group to a second dismissal group.

9. The system of claim 6, wherein the executable instructions include instructions to:
show on the display a status for incoming vehicles associated with each of the students.

10. The system of claim 6, wherein the executable instructions include instructions to:
change a status for each of the students on the display in response to proximity of incoming vehicles relative to a geo-fence.

11. The system of claim 6, further comprising:
a smart board disposed in the classroom and configured with the display.

12. The system of claim 6, further comprising:
a pair of mobile devices, one configured to receive inputs that correspond with positions of incoming vehicles in the dismissal groups and one configured to receive inputs that initiate dismissal of students from the classroom in response to formation of at least one dismissal group.

13. A method, comprising:
generating a first user interface to receive manual inputs to assign incoming vehicles to positions in dismissal groups at a staging area on school grounds, the positions associated with a vehicle identifier that is assigned to each of the incoming vehicles, the dismissal groups each having a fixed number of positions;
generating a second user interface that associates students in a classroom with one of the dismissal groups and provides queueing information to indicate dismissal of all of the students in a dismissal group from the classroom and in sequence according to the dismissal group;
generating a third user interface to receive manual inputs that initiate dismissal of students from the classroom in response to formation of at least one dismissal group once the fixed number of positions are filled; and
generating a fourth user interface to receive manual inputs to release the dismissal groups from the staging area according to a count that associates each student with one of the incoming vehicles.

14. The method of claim 13, wherein the first user interface includes a list of vehicle identifiers that correspond with incoming vehicles in a staging area on school grounds.

15. The method of claim 13, wherein the first user interface includes a list of vehicle identifiers that is pre-populated in response to proximity of the incoming vehicles to a geo-fence proximate school grounds.

16. The method of claim 13, wherein the second user interface separates the display into individual identifiers for each of the students, the individual identifiers including a group number corresponding with one of the dismissal groups.

17. The method of claim 13, further comprising:
displaying the second user interface on a smart board in the classroom.

18. The method of claim 13, wherein the first user interface, the second user interface, and the third user interface correspond with displays on independent computing devices.

* * * * *